Oct. 28, 1969   L. D. BURGESS   3,474,816
PURGEABLE GAS PRESSURE REGULATORS
Filed July 25, 1967   4 Sheets-Sheet 1

INVENTOR:
LESTER D. BURGESS
BY Howson & Howson
ATTYS.

Oct. 28, 1969 L. D. BURGESS 3,474,816
PURGEABLE GAS PRESSURE REGULATORS
Filed July 25, 1967 4 Sheets-Sheet 2

INVENTOR:
LESTER D. BURGESS
BY Howson & Howson
ATTYS.

Oct. 28, 1969  L. D. BURGESS  3,474,816
PURGEABLE GAS PRESSURE REGULATORS
Filed July 25, 1967  4 Sheets-Sheet 3

INVENTOR:
LESTER D. BURGESS
BY Howson & Howson
ATTYS.

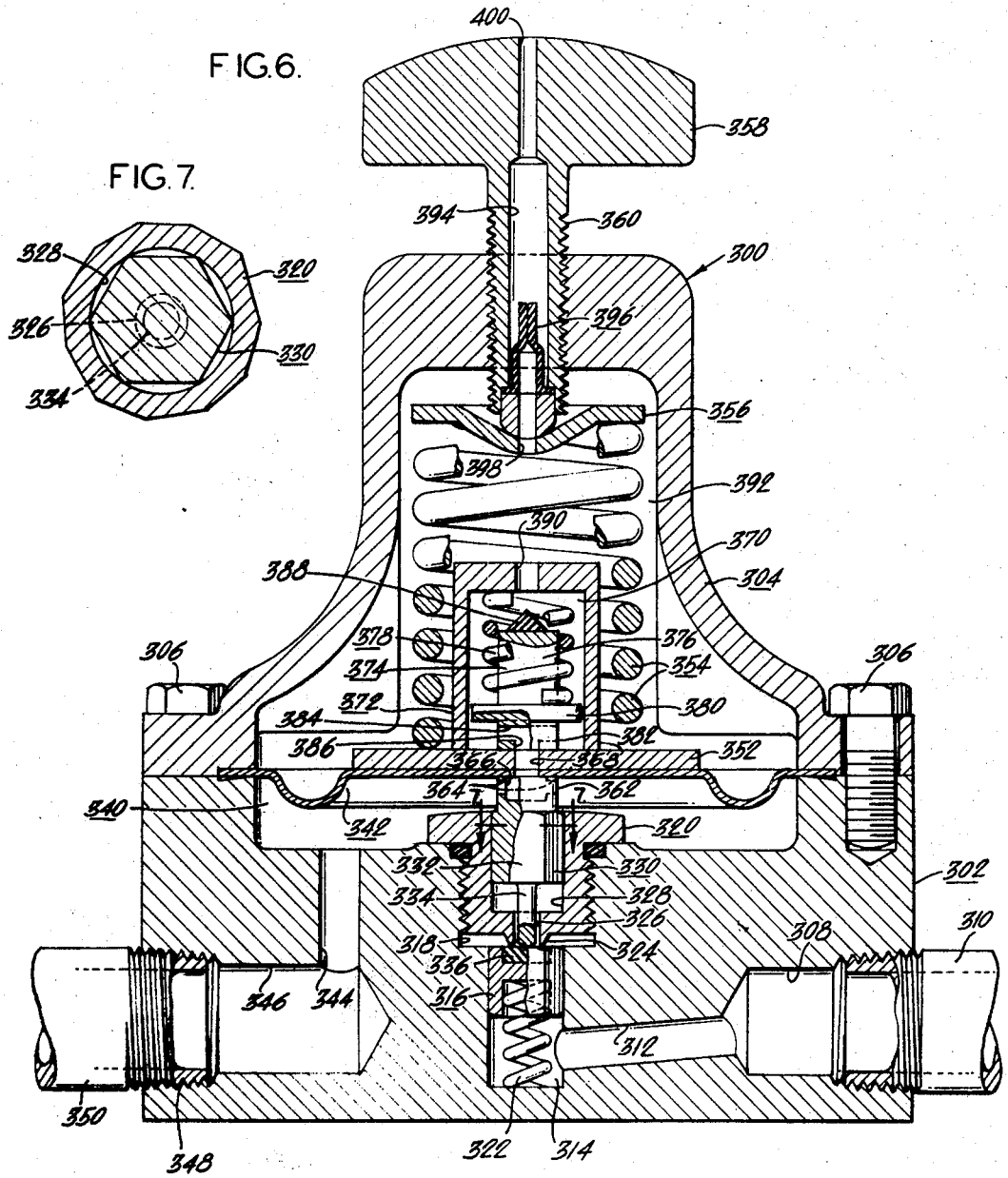

United States Patent Office 3,474,816
Patented Oct. 28, 1969

3,474,816
PURGEABLE GAS PRESSURE REGULATORS
Lester D. Burgess, Connaminson, N.J., assignor to Lif-O-Gen, Inc., Lumberton, N.J., a corporation of Delaware
Filed July 25, 1967, Ser. No. 655,913
Int. Cl. G05d 16/10
U.S. Cl. 137—238
8 Claims

ABSTRACT OF THE DISCLOSURE

Gas pressure regulators of the piston or diaphragm type for use with ultrapure gases including means for selectively purging the piston or diaphragm spring chamber with a flow of pure gas to prevent contamination of the regulator gas flow by leakage or diffusion of gas from the spring chamber.

---

The present invention relates generally to gas pressure regulators of the type designed to regulate the delivery of gases in the ultrapure state. More specifically, the invention relates to gas pressure regulators of the piston or diaphragm type which are provided with purging means for eliminating possible contaminants from within the regulator assembly.

In the use of ultrapure gases such as in experimental laboratory work, careful preparation of the gas flow channels is required to prevent contamination of the gas flow from exterior and interior sources. External contamination can be readily prevented by well known seal arrangements, but internal contamination is a far more serious problem. To minimize the possibility of internal contamination by gas molecules adhering to the flow channel surfaces, heat in exces of 400° F. is commonly applied to the apparatus while the channels are evacuated to vacuums in the submicron range. In addition, the flow channels may be flushed with small volumes of pure gas to reduce to an absolute minimum the contaminating elements that may be present.

A presure regulator of one or more stages is commonly utilized for pure gas delivery and may be of the piston or diaphragm type. Conventional regulators for this purpose are available which provide a durable seal of the flow channels from the external atmosphere. However, as indicated above, contamination from within the regulator is a major problem. Submicron particles and part-per-million contaminants are known to adhere or adsorb to the wetted surfaces of the regulator. Various adherent effects are evident, such as electrostatic adhesion and mechanical entrapment, and some method is needed to dilute these adherent contaminants to or below acceptable levels. Presently available regulators require extremely lengthy and costly purging techniques. In some instances, days of preparation are necessary before the regulator is ready for use.

By the present invention, regulators of either the piston or diaphragm type are provided with a self-purging arrangement which permits, in addition to the application of heat and vacuum to discharge entrapped contaminants, the flow of pure gas through the piston or diaphragm spring chamber to displace or dilute the contaminants present. By completely immersing the pressure responsive piston or diaphragm in pure gas, the contaminating effect of leakage around or diffusion through the pressure responsive element from the spring chamber is eliminated and the purity of the gas flowing through the regulator is maintained. An important benefit derived from the elimination of diffusion leaks in diaphragm type regulators as a source of contamination is the permissible use of more sensitive diaphragm materials for a more accurate control of gas pressures. Thus rubber or other elastic membranes may be employed rather than metal such as stainless steel to substantially increase the sensitivity of the pressure control.

In view of the above, it can accordingly be understood to be a primary object of the present invention to provide an integral selectively operable purging arrangement for gas pressure regulators of both the piston and diaphragm type which utilizes a selective flow of the pure gas being regulated to purge the piston or diaphragm spring chamber, thus immersing the piston or diaphragm in pure gas and eliminating contamination of the regulator flow by diffusion or direct leakage of gas from the spring chamber.

A further object of the present invention is to provide a purging arrangement for gas presure regulators as described which may be used in conjunction with the application of heat and a vacuum to displace contaminants from the interior of the regulator.

Another object of the invention is to provide a regulator purging arrangement as described which requires no external attachments and which may be selectively employed during operation of the regulator without interrupting the gas flow through the regulator.

A further object of the invention is to provide a purging arrangement as described of a relatively simple inexpensive construction and which may be adapted to a variety of regulator designs.

Additional objects and advantages of the present invention will be more readily apparent from the following detailed description of embodiments thereof when taken together with the accompanying drawings in which:

FIG. 6 is a sectional view taken through a diaphragm type gas pressure regulator having another form of purging arrangement in accordance with the present invention; and FIG. 7 is an enlarged sectional view taken along line 7—7 of FIG. 6.

Figure 1:
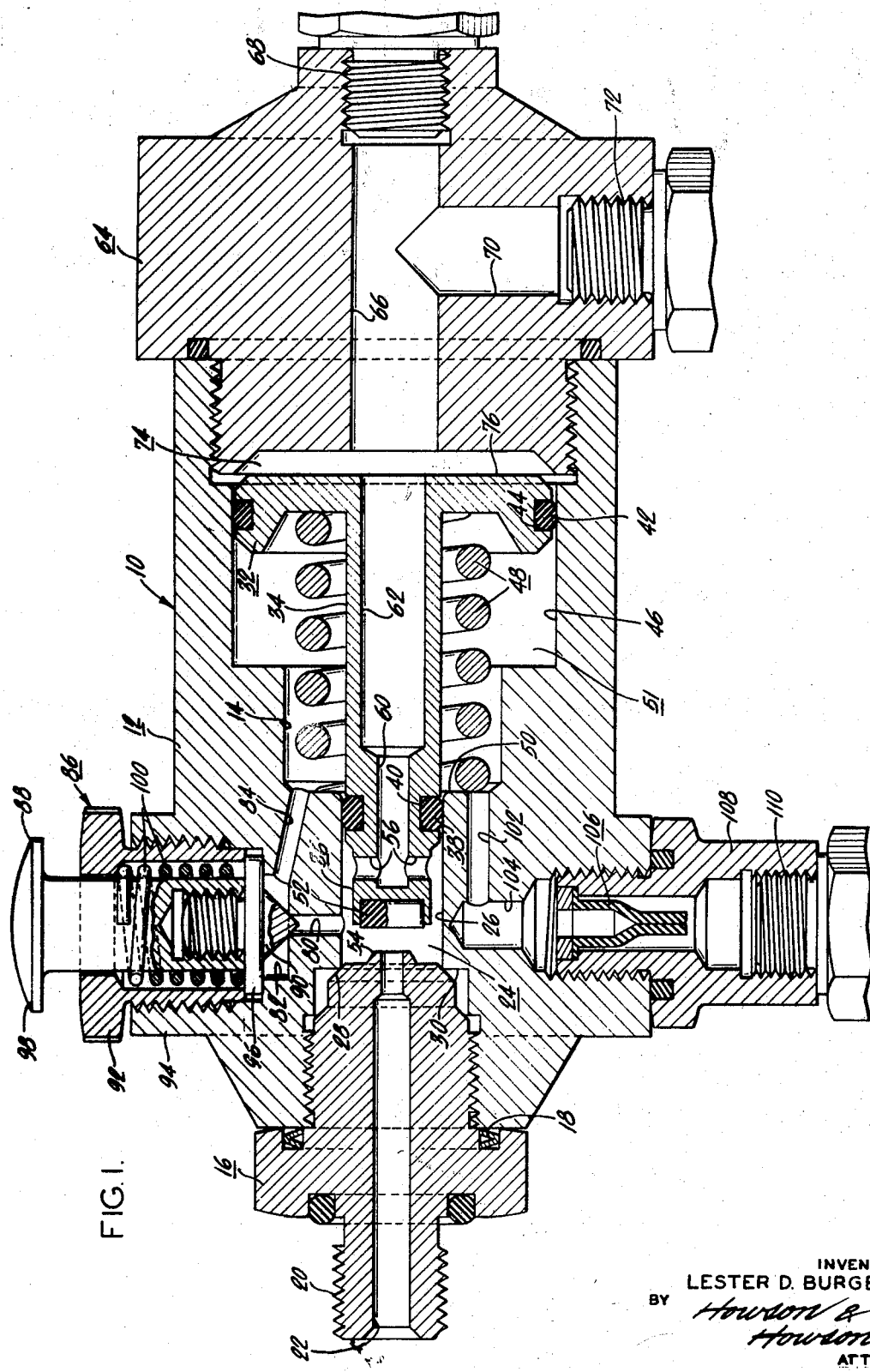
FIG. 1 is a longitudinal sectional view taken through a piston type gas pressure regulator having a purging arrangement in accordance with the present invention.

Referring to the drawings and particularly FIG. 1 thereof, a piston type gas pressure regulator generally designated 10 is shown and includes a generally cylindrical body 12 having a stepped bore 14 extending axially therethrough. At the left end of the body 12, a seat member 16 is threadedly engaged within the bore 14 and includes a metal seal 18 to seal the end of the bore. The seat member 16 includes an axial gas inlet passage 22 and terminates outwardly in a threaded connector 20 adapted for attachment to a source of pure gas under pressure. At its inner end, the seat member 16 extends into a chamber 24 formed within a reduced diameter portion 26 of the bore 14. An annular beveled surface 28 of the seat member 16 bears against a shoulder 30 of the valve body to seal the left end of the chamber 24.

Slidably located within the bore 14 opposed from the seat 16 is a piston 32 which includes a substantially cylindrical stem 34 extending into the chamber 24 and terminating therewithin in necked down portion 36. An O-ring 38 seated in groove 40 of stem 34 seals the right hand end of the chamber 24. An O-ring 42 in slot 44 of the piston engages the enlarged diameter portion 46 of the bore 14. A compression coil spring 48 seated against the shoulder 50 of the regulator body bears against and urges the piston 32 away from the seat 16. The spring 48 is disposed within a sealed spring chamber 51 of the bore 14 which is sealed at its respective ends by O-rings 38 and 42.

The necked down portion 36 of the piston includes a resilient seal element 52 opposed from and adapted to seat in sealing relation against a seat 54 of the seat member 16 when the piston is moved to its extreme leftward position. A transverse passage 56 in the necked down portion 36 provides a communication from the chamber 24 into an axial bore 60 of the stem 34 and its enlarged continuation 62 which extends through the right end of the piston.

Threadedly secured to the right hand end of the body 12 is a bonnet 64 which includes an axial passage 66 leading from the bore 14 of the regulator to a threaded outlet 68. A transverse bore 70 leads from bore 66 to a secondary threaded outlet 72.

The regulator as described thus far is conventional in structure and operates in a well known manner to provide a predetermined gas pressure at the outlets 68 and 72. The pure gas flows through the inlet passage 22 into chamber 24 and thence through the passage 56 and bores 60 and 62 into a pressure chamber 74 between the piston and the bonnet, passing out of the regulator through passage 66 and outlets 68 and 72. The gas pressure in pressure chamber 74 acting against the right hand face 76 of the piston is balanced against the force of the spring 48 and the gas pressure in chamber 24 acting on the small axial area of stem 34 to produce an equilibrium posiiton of the piston. The piston position by governing the spacing between seal element 52 and seat 54 controls the throttling effect of these elements and hence the outlet pressure of the gas.

Should the gas pressure in the regulator increase above the desired level, the gas pressure acting against the piston and spring will move the piston to the left and throttle the flow of gas passing from the inlet passage 22 into the chamber 24. Should the pressure decrease below the desired level, the spring force will move the piston to the right thus increasing the gas flow through the inlet passage 22. If flow through outlets 68 and 70 is stopped, the pressure buildup against the face 76 of the piston will move the piston to the left to seal the resilient element 52 against the seat 54 thus preventing further entrance of gas from the inlet passage into the regulator chamber 24.

A major problem of piston type regulators which makes them generally unsuitable for ultra-pure gas pressure regulation is the inevitable migration of gas from the piston spring chamber 51 into either the chamber 24 or the pressure chamber 74. Leakage and possible contamination of the pure gas flowing through the regulator can occur either due to diffusion through or leakage around the rolling and sliding O-rings 38 and 42.

The basic concept of the present invention is to provide a means for purging and filling the spring chamber 51 and the equivalent chamber in the diaphragm type valves described below with the same pure gas passing through the regulator. By doing so, the passage of gas between the spring chamber 51 and chambers 24 and 74 would have no effect on the purity of the gas flow through the regulator. Even if by diffusion some contamination should develop in the spring chamber, the amount would be so small in relation to the amount of pure gas in the chamber that any dilution of the regulator flow by leakage through or around the O-rings would be so small as to be negligible, and could be corrected during operation of the regulator by a purging of the spring chamber in the manner set forth below.

The purging means broadly comprises a communicating passage between the chamber 24 and spring chamber 51 having valve means therein permitting a selective flow of pure gas into the spring chamber, and an outlet passage from the spring chamber to the atmosphere or suitable collecting means including a check valve adapted to maintain a low positive pressure within the spring chamber. Specifically, the purging means includes a passage 80 leading from the chamber 24 into a purge valve chamber 82 which in turn is connected to the spring chamber 51 by means of passage 84. A manually operated purge valve 86 includes a plunger 88 having a conical valve element 90 in the purge valve chamber 82 adapted to seat in the upper end of the passage 80 in the closed position of the valve. A valve cap 92 threadedly disposed within a boss 94 of the regulator body 12 when rotated into the closed position illustrated bears against a flange 96 of valve element 90 to lock the plunger in the closed position. On loosening of the valve cap, the plunger may be raised by means of a knob 98 against the force of a spring 100 extending between the flange 96 and the upper end of the valve cap 92 to permit a flow of pure gas from the chamber 24 through passage 80 into chamber 82 and thence through passage 84 into the spring chamber 51.

The gas displaced from the spring chamber by the flow of pure gas passes through passage 102 into bore 104 and through a check valve 106. The check valve illustrated is of a type known as a Thomas valve or duckbill valve and is secured in place by means of an outlet cap 108 having a threaded outlet port 110 which may be attached to a suitable gas conduit if the purged gas is to be collected rather than released to the atmosphere.

The operation of the purging arrangement is obvious from the above description, the valve cap 92 being rotatably released and the knob 98 being raised against the force of the compression spring 100 to lift the valve element 90 away from the passage 80 permitting a flow of pure gas from the chamber 24 into the spring chamber 51, thereby displacing gases in the spring chamber which are forced through the passage 102, bore 104 and through the cehck valve 106 into the atmosphere or suitable receiver. The check valve 106 should maintain a positive pressure of about three inches of water pressure in the spring chamber. By means of the present purging arrangement, the spring chamber can be maintained filled with pure gases at all times during the operation of the regulator and leakage around or through the O-rings 38 and 42 will not affect the purity of gas flow through the regulator. When the purge valve is not in use, the valve cap 92 is tightened to lock the plunger 88 in the closed position illustrated.

An alternate method of utilizing the described purge arrangement involves the shutting off of the pure gas supply at a point above the inlet passage 22 and then introducing a pure gas through the bonnet bore 66, the gas traveling through the piston into the chamber 24 and thence through the purge valve and into the spring chamber. In this manner the bonnet bore 66, pressure chamber 74, piston bores 60 and 62, and the chamber 24 would be subjected to the purifying flow of gas in addition to the spring chamber 51.

Figures 2, 3:
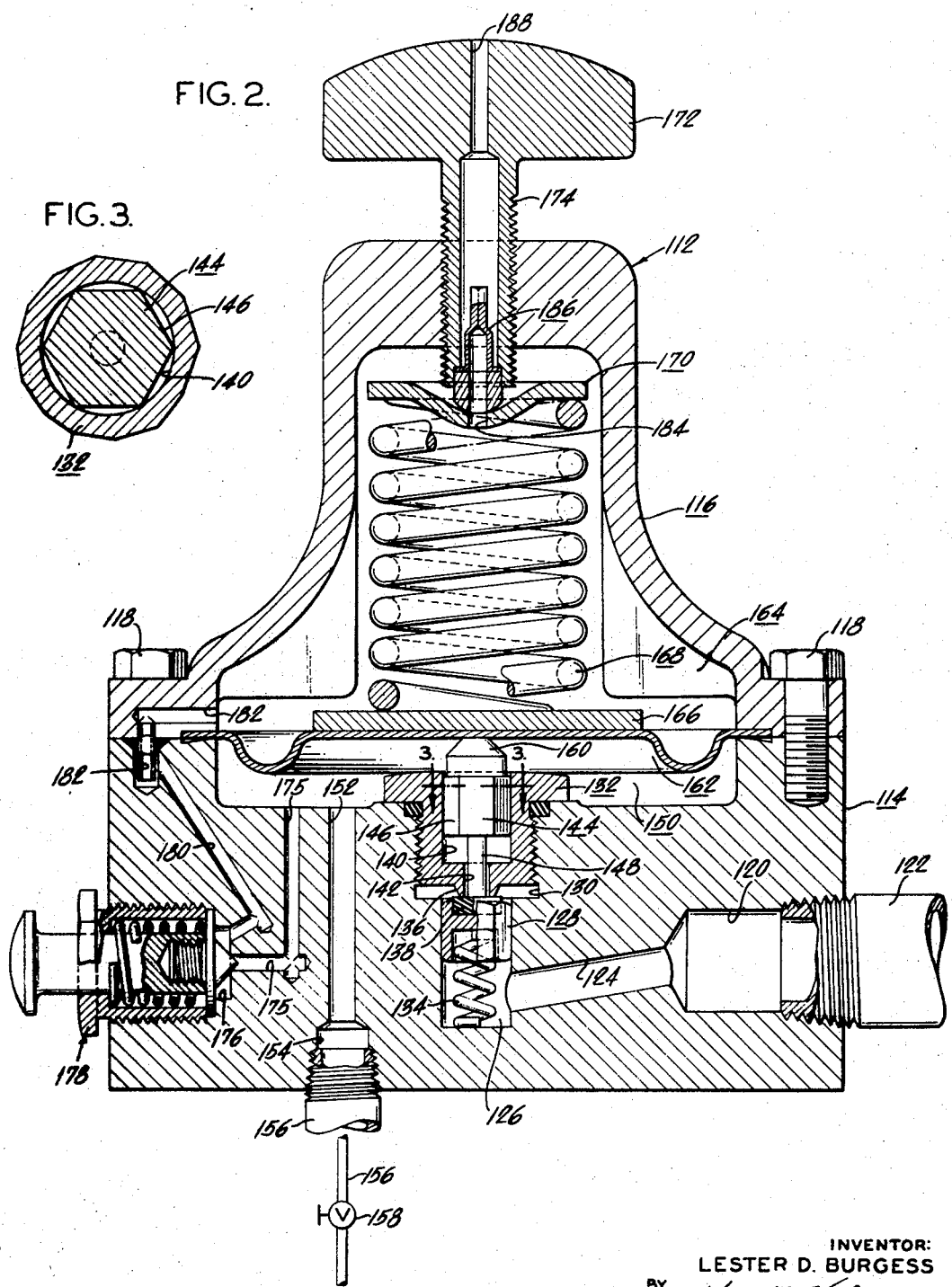
FIG. 2 is a sectional view taken through a diaphragm type gas pressure regulator having a purging arrangement in accordance with the present invention.
FIG. 3 is an enlarged sectional view taken along line 3—3 of FIG. 2.

In the embodiment of the invention shown in FIGS. 2 and 3, a single stage diaphragm type regulator generally designated 112 is illustrated comprising a cylindrical body 114 and a bonnet 116 secured thereto by bolts 118. The body 114 includes an inlet port 120 to which is threadably connected an inlet conduit 122 leading to a source of pure gas under pressure. The pressurized pure gas passes from the inlet port through passage 124 into an axial bore 126, thence past a hexagonal valve element 128 into an annular chamber 130 formed beneath valve seat 132 threadably secured in the regulator body. The valve element 128 is upwardly biased by a light compression coil spring 134 and, in its extreme upper position illustrated, bears against the downwardly extending nose 136 of the seat 132, a resilient element 138 in the valve element bearing in sealing relation against nose 136.

The seat 132 includes an axial bore 140 which communicates by means of axial passage 142 with the bore 126 when the valve element 128 is moved away from the nose 136 of the seat. To provide such movement under appropriate gas pressure conditions and permit a flow of gas from the chamber 130 into the bore 140 of the seat 132, a plunger 144 is provided having a hexagonal body portion 146 adapted for sliding movement within the bore 140 as illustrated in FIG. 3. An axial stem portion 148 of the plunger extends downwardly through the passage 142 and engages the resilient element 138 of the valve element 128. The axial passage 142 and the stem portion 148 of the plunger 144 are relatively sized to provide a sizeable clearance permitting gas passage from the chamber 130 around the stem portion into the bore 140. Gas passing from the bore 140 around the hexagonal body portion of the plunger 144 enters a pressure chamber 150 from which it passes through an outlet passage 152 and outlet port 154 into an outlet conduit 156 which as schematically illustrated is provided with a flow control valve 158.

The upper frustoconical shaped end 160 of the plunger 144 engages a flexible diaphragm 162 which is clamped between the bonnet 116 and body 114 of the regulator. The diaphragm separates the pressure chamber 150 from the opposed spring chamber 164 of the bonnet. A backing plate 166 on the bonnet side of the diaphragm provides a seat for a compression coil spring 168 which at its upper end bears against an adjustable spring seat 170, the position of which may be adjusted by means of adjusting knob 172 having a hollow threaded stem 174 passing through an axial threaded bore in the bonnet.

The regulator structure thus far described functions in a conventional manner as follows. A pressurized gas passing through the inlet 120, passage 124 and bore 126, enters the chamber 130 and, with the valve element 128 in a spaced position below the valve seat 132, passes through passage 142 into bore 140 and into the pressure chamber 150. The pressure of the gas in the pressure chamber acting on the diaphragm 162 against the force of the spring 168 moves the diaphragm into an equilibrium position. Movement of the diaphragm provides a corresponding movement of the plunger 144 and the valve element 128, the plunger and valve element being held together against the diaphragm for movement therewith by the spring 134.

An increase in pressure in the pressure chamber 150 moves the diaphragm upwardly against the force of spring 168 thus displacing the plunger 144 and valve element 128 upwardly to restrict the opening between the seat nose 136 and the valve element through which the gas passes into the passage 142. Should the gas pressure decrease in the pressure chamber, the spring force will move the diaphragm downwardly thereby moving the valve element 128 away from the seat nose and opening the flow passage therebetween. When the valve 158 in the outlet conduit is closed, the gas pressure will build up in the pressure chamber 150 to a degree permitting the seating of the valve element 128 against the seat nose 136 in the position shown thereby cutting off the flow of gas. The outlet pressure of the regulator is controlled by means of the adjusting knob 172.

It is highly desirable in a diaphragm type pressure regulator to use a diaphragm of rubber or other elastic material to gain a sensitive control of the delivery pressure. However, the porosity of elastic membranes is generally such as to rule out their use for the regulation of ultra-pure gases. As a result, the diaphragms of such regulators are conventionally made of stainless steel or other metal.

By the purging arrangement of the present invention, however, the spring chamber 164 defined by the diaphragm and the interior walls of the bonnet is filled with pure gas so that any diffusion leakage through the diaphragm will not contaminate the regulator gas flow. By providing such purging means, the diaphragm may be made of thin elastic materials without concern for their increased porosity to provide a more sensitive pressure regulation.

The purging means for the regulator 112 includes passages 175 connecting the pressure chamber 150 with a purge valve chamber 176 in which is located a purge valve 178 of the same construction as the purge valve 86 of the embodiment of FIG. 1. Passages 180 lead from the purge valve chamber 176 into passages 182 in the bonnet communicating with the spring chamber 164. By opening the purge valve 178, a flow of pure gas may accordingly be directed into the spring chamber. Displaced gas is evacuated from the spring chamber 164 through an aperture 184 in the spring seat 170 which leads into a check valve 186 mounted within the stem bore 174. The bore 174 opens into a smaller bore 188 in the knob 172 which opens to the atmosphere.

To operate the purge means of the regulator 112, it is only necessary to open the purge valve 178 to permit the desired quantity of pure gas to flow from the pressure chamber 150 into the spring chamber 164 thereby displacing gas from the spring chamber through the check valve 186 to the atmosphere. The diaphragm is thus immersed in pure gas and contamination of the gas flow through the regulator due to porosity of the diaphragm is no longer a significant problem. As was the case with the embodiment of FIG. 1, the purge means may be periodically actuated without interrupting the regulator operation or requiring the connection of any additional equipment. The check valve 186, which is preferably of the so called Thomas or duckbill type, should be adapted to retain a low positive pressure in the spring chamber 172.

Figure 4:
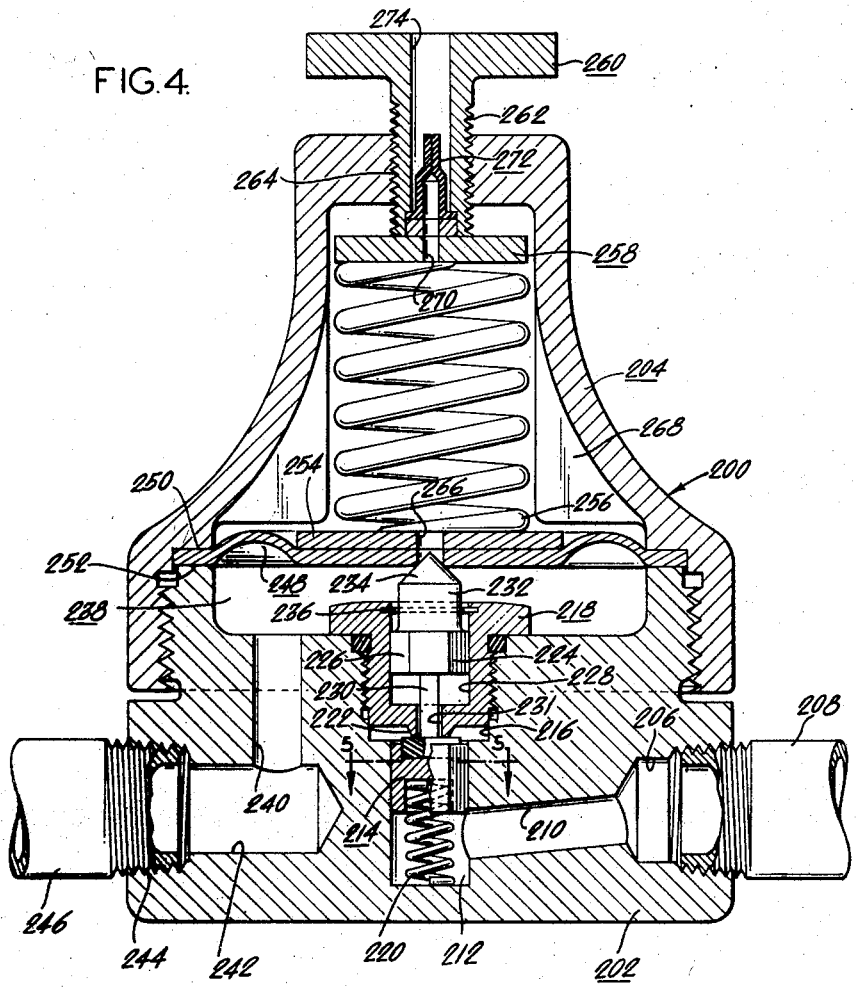
FIG. 4 is a sectional view taken through a diaphragm type gas pressure regulator similar to that shown in FIG. 2 having a modified purging arrangement in accordance with the present invention.
Figure 5:
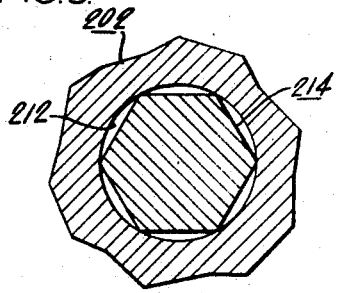
FIG. 5 is an enlarged sectional view taken along line 5—5 of FIG. 4.

The embodiment of FIGS. 4 and 5 is in many respects similar to that of FIGS. 2 and 3, involving a similar diaphragm type pressure regulator and providing means for passing and maintaining a pure gas within the spring chamber of the regulator. However, the means for controlling the passage of pure gas into the spring chamber is susbtantially different in this embodiment.

Referring to FIGS. 4 and 5, a diaphragm-type regulator generally designated 200 comprises a cylindrical regulator body 202 having a bonnet 204 threadedly secured thereto. A pressurized gas entering the inlet port 206 in the body 202 from the inlet conduit 208 passes through passage 210 into axial bore 212, thence past the hexagonal valve element 214 into the chamber 216 formed beneath the valve seat 218 threadedly secured within the regulator body. A spring 220 biases the valve element 214 upwardly toward the downwardly protruding nose 222 of the seat 218. A plunger 224 having a hexagonal body portion 226 is slidably disposed within a bore 228 of the seat 218 and includes a downwardly extending stem 230, the lower end of which passes through aperture 231 the seat and bears against the valve element 214. The plunger 224 extends upwardly in a cylindrical portion 232, terminating in a conical tip 234. A retaining ring 236 in the seat element 218 limits the upward travel of the plunger.

Gas flowing upwardly past the plunger 224 passes into pressure chamber 238 and thence through discharge passages 240, 242 into outlet port 244 and outlet conduit 246. Extending across and in part defining the pressure chamber 238 is a flexible diaphragm 248 which is clamped between a shoulder 250 of the bonnet 204 and the upper edge 252 of the regulator body 202. A backing plate 254 on the upper surface of the diaphragm 248 provides a bearing surface for the lower end of compression coil spring 256. The upper end of the spring bears against the adjustable spring seat 258 which may be selectively positioned by the adjusting knob 260 having the threaded hollow stem 262 engaged within the threaded aperture 264 of the bonnet 204.

An axial passage 266 passes through the diaphragm 248 and backing plate 254 and is adapted to receive the conical tip 234 of the plunger 224 which acts as a valve in opening and closing the passage in a manner described below. When the passage 266 is open, pure gas from the pressure chamber 238 may pass into the spring chamber 268 of the bonnet to displace contaminants present therein and to maintain pure gas on both sides of the flexible diaphragm. The gas displaced from the spring chamber 268 passes through aperture 270 in the spring seat 258, through a check valve 272 within the hollow stem 262 of the adjusting knob 260, and thence through the stem bore 274 to the atmosphere.

The operation of the regulator 200 aside from the purging arrangement is practically identical with that of the embodiment shown in FIGS. 2 and 3. Gas under pressure admitted through the inlet port 206 flows through the passage 210 into bore 212, around the valve element 214 into chamber 216, thence through aperture 231 into bore 228 and into the pressure chamber 238, therein acting against the flexible diaphragm 248 and positioning the diaphragm in an equilibrium position against the force of the compression spring 256. The equilibrium position of the diaphragm in the manner described above produces a corresponding position of the valve element 214 thus regulating the output pressure of the regulator. The gas flows from the pressure chamber 238 through passages 240 and 242 into the outlet conduit 246 at a predetermined regulated pressure which may be adjusted by means of the control knob 260 by varying the force of the spring 256 acting on the diaphragm 248.

The purging arrangement of the regulator 204 functions as follows. With the regulator connected to a source of pure gas under pressure by means of the conduit 208, the spring adjusting knob 260 is screwed inwardly until the valve element 214 is lowered from the seat nose 222 permitting a flow of gas into the pressure chamber 238. The adjusting knob is then screwed outwardly to permit the diaphragm 248 to move away from the conical tip 234 of the plunger 224 thereby permitting a flow of pure gas into the spring chamber 268 which displaces gas outwardly through the aperture 270 in the spring plate 258 through the check valve 272 into the atmosphere. When the diaphragm is permitted to separate from the plunger 224, the spring 220 will close the valve element 214 preventing any further gas flow into the pressure chamber. The gas in the pressure chamber available for purging is thus limited, and it may be necessary to repeat the operation several times to effectively fill the spring chamber with pure gas. As was the case with the embodiments of FIGS. 1–3, the check valve 272 is preferably adapted to maintain a low positive pressure in the spring chamber 268.

The embodiments shown in FIGS. 6 and 7 are directed to a diaphragm type regulator which functions in a manner quite similar to that of the embodiments of FIGS. 2–5, the essential difference being in the provision of a modified type of purging arrangement which operates automatically when the regulator is opened for gas flow. Referring to FIGS. 6 and 7, the regulator generally designated 300 includes a cylindrical regulator body 302 to which is secured a bonnet 304 by bolts 306. A pure gas under pressure is admitted to an inlet port 308 of the regulator body 302 by means of inlet conduit 310 and passes through passage 312 into axial bore 314. The pure gas passes around a hexagonal valve element 316 into chamber 318 formed beneath a valve seat 320 which is threadedly secured within the regulator body 302. The valve element 316 is biased by a spring 322 upwardly against nose 324 of the seat 320, in the seated position closing off flow through a passage 326 in the valve seat which leads to the seat bore 328. Plunger 330 having a hexagonal body portion 332 is slidably disposed within the seat bore 328 and includes a plunger stem 334 extending downwardly through the passage 326, the end of the stem 334 engaging a resilient seal 336 in the valve element 316.

Pure gas passing around the valve element 316 through aperture 326 and bore 328 flows into the pressure chamber 340 across which extends the circular flexible diaphragm 342 clamped between the bonnet 304 and the regulator body 302. The gas passes from the pressure chamber 340 through passages 344, 346, outlet port 348 and into outlet conduit 350. A backing plate 352 along the bonnet side of the diaphragm provides a seat for compression coil spring 354 which at its upper end bears against an adjustable spring seat 356. Adjusting knob 358 having a hollow valve stem 360 threaded through the bonnet permits adjustment of the spring 354.

The pressure regulating operation of the regulator 300 is identical with that described with respect to the embodiments of FIGS. 2–5 and a further description of this operation is unnecessary. However, the purging means and operation is significantly different as will be presently described. The upper end 362 of the plunger 330 is provided with a plurality of apertures 364 leading into a chamber 366 which when the plunger bears against the diaphragm 342, communicates with passage 368 in the diaphragm and backing plate 352. The passage 368 opens into chamber 370 formed by a housing 372 attached to the backing plate 352. A purge valve element 374 is disposed for axial movement within the housing 372 and includes a cylindrical portion 376 encircled by a compression hair spring 378, the spring extending between a flange 380 of the valve element 374 and the end of the housing 372 thereby lightly biasing the valve element 374 toward the backing plate 352. The lower end 382 of the valve element 374 includes a transverse passage 384 communicating with an axial passage 386 thus permitting gas flow from the passage 368 into the chamber 370 regardless of the position of the valve element 374. The opposite end of the valve element terminates in a conical valve tip 388 adapted to seat within an axial passage 390 in the housing which provides communication between the chamber 370 and the spring chamber 392 of the bonnet.

Mounted within bore 394 of the knob stem 360 is a check valve 396 which by means of passage 398 through the spring plate 356 and passage 400 in the knob permits an outward displacement of gas from the spring chamber 392 to the atmosphere upon a small pressure rise in the spring chamber.

For operation, the embodiment of FIGS. 6 and 7 is connected by means of conduit 310 with a pressurized source of pure gas and the adjusting knob 358 is turned inwardly until the valve element 316 is moved away from the seat nose 324, permitting gas to flow upwardly into the pressure chamber 340. The pure gas flow passes through the apertures 364 in the upper end of the plunger 328 into the chamber 366, through passage 368, 386 and 384 into the chamber 370 of the housing 372. The slow initial flow of gas passes around the flange 380 of the purge valve element 374 and through the passage 390 into the spring chamber 392. The pure gas flow into the spring chamber increases the pressure in the chamber thus opening the check valve 396 and permitting an exhaustion of gases to the atmosphere. As the adjusting knob 358 is further rotated inwardly, the valve element 316 moves further from the seat tip 324 and the gas flow increases, the force of the increased flow moving the purge valve element 374 against the force of the hair spring 378 and moving the element upwardly to seat the conical tip 388 in the passage 390, thus blocking further flow of pure gas into the spring chamber. Because of the resulting area differential of the element 374 exposed to the pure gas pressure, the element will remain in the raised position until the pressure in the pressure chamber 340 and hence in the chamber 370 is reduced upon shut off of the regulator by withdrawal of the adjusting knob 358. The purge valve thus provides an automatic purging of the spring chamber 392 each time the adjusting knob 358 is moved from the withdrawn shut off position into a position permitting gas flow through the regulator. Pure gas is maintained on both sides of the flexible diaphragm 342 and the possibility of contamination through diffusion is essentially eliminated.

A further advantage of the purging arrangement illustrated in FIGS. 6 and 7 is the permissible evacuation of the regions on both sides of the diaphragm by applying a vacuum downstream of the regulator. This evacuation can be extended by inward rotation of the adjusting knob 358 to include the bore 314, passage 312 inlet port and inlet conduit and the entire gas flow passage up to the gas source shut off valve.

From the foregoing, the present invention can be understood to be applicable in a number of embodiments to different types of gas pressure regulators and in its broadest sense comprises means for permitting a flow of pure gas into the regions on both sides of the pressure responsive element whether it be a diaphragm or a piston. By this arrangement, any direct leakage or diffusion leakage through the pressure responsive element, which in any event will be extremely small, will not affect the purity of gas flow through the regulator since the leakage gas will itself be substantially the same pure gas.

The purgeable piston or diaphragm type regulators may be used in series to provide several stages of regulation and may also be used in series with conventional non-purgeable regulators.

I claim:

1. In a gas pressure regulator including a pressure chamber having spring-biased means responsive to pressure therewithin for regulating flow through the pressure chamber and including a spring chamber adjacent said means opposed from said pressure chamber, the improvement comprising purge means for purging the spring chamber with the gas flowing through the regulator, said purge means including a passage in the regulator connecting the spring chamber with a source of the regulated gas, valve means in said passage selectively operable to permit a flow of the regulated gas into the spring chamber, a passage leading from the spring chamber to the exterior of the regulator, and a check valve in said latter passage permitting only outward flow from said spring chamber.

2. In a gas pressure regulator comprising a housing, gas inlet and outlet ports in said housing, a pressure chamber in said housing, passage means in said housing connecting said inlet and outlet ports with said pressure chamber, valve means in said housing controlling the flow from said inlet port to said pressure chamber, gas pressure responsive means associated with said pressure chamber, spring means resiliently biasing said pressure responsive mean in opposition to the gas pressure to position said pressure responsive means in accordance with the pressure in said pressure chamber, means connecting said pressure responsive means with said valve means, and a spring chamber adjacent said pressure responsive means opposed from said pressure chamber, the improvement comprising purge means for purging the spring chamber with the gas flowing through the regulator, said purge means including a passage in said regulator connecting said spring chamber with a source of the regulated gas, valve means in said passage selectively operable to permit a flow of the regulated gas into the spring chamber, a passage leading from the spring chamber to the exterior of the regulator, and a check valve in said latter passage permitting only outward flow from the spring chamber.

3. In a piston type gas pressure regulator including a flow regulating piston having at least one face thereof subjected to the regulator gas pressure, and a spring chamber adjacent said piston, the improvement comprising purge means for purging the spring chamber with the gas flowing through the regulator, said purge means including means for selectively providing a gas flow into said spring chamber, passage means leading from the spring chamber exteriorly of the regulator, and a check valve in said passage means permitting only outward flow from said spring chamber.

4. In a diaphragm type gas pressure regulator including a pressure chamber along one side of the regulator diaphragm through which chamber the regulated gas passes, and a spring chamber along the opposite side of the diaphragm opposed from the pressure chamber, the improvement comprising purge means for purging the spring chamber with the gas flowing through the regulator, said purge means comprising passage means connecting the pressure chamber and spring chamber, valve means in said passage means for selectively providing a flow of gas from said pressure chamber to said spring chamber, passage means leading from said spring chamber exteriorly of the regulator, and a check valve in said passage means permitting only outward flow from said spring chamber.

5. A purgeable diaphragm type gas pressure regulator comprising a housing, a diaphragm in said housing dividing a pressure chamber from a spring chamber in the housing, gas inlet and outlet means in said housing communicating with said pressure chamber, valve means in said inlet means controlled by said diaphragm for regulating the flow into said pressure chamber, adjustable spring means for biasing said diaphragm against the force of the gas pressure in said pressure chamber, and purge means for purging said spring chamber with a flow of the gas passing through the regulator, said purge means comprising an aperture in said diaphragm closed by engagement of said diaphragm with said valve during regulator operation, said aperture being open permitting gas passage from the pressure chamber to the spring chamber when said spring means is adjusted to reduce the force on the diaphragm thus allowing the valve means to close and permitting the separation of the diaphragm from the valve means, and passage means from said spring chamber leading exteriorly of the regulator and including a check valve therein permitting flow only outwardly from the spring chamber.

6. A purgeable regulator as claimed in claim 5 wherein said valve means comprises a valve actuating plunger having a conical tip spring biased in engagement with the diaphragm aperture in the diaphragm operating position, and means limiting movement of said plunger toward said diaphragm thereby permitting separation of the diaphragm and plunger upon adjustment of the diaphragm spring means.

7. A purgeable diaphragm type gas pressure regulator comprising a housing, a diaphragm dividing a pressure chamber from a spring chamber in said housing, gas inlet and outlet means in said housing communicating with said pressure chamber, valve means in said inlet means controlled by said diaphragm for regulating the gas flow into said pressure chamber, adjustable spring means for biasing said diaphragm against the force of the gas pressure in said pressure chamber, and purge means for purging said spring chamber with a flow of the gas passing through the regulator, said purge means comprising a housing in the spring chamber secured to the diaphragm and forming a purge valve chamber therewithin, an aperture in the diaphragm connecting the pressure chamber with the purge valve chamber, an aperture in said housing connecting said purge valve chamber with said spring chamber, a purge valve element in said housing adapted to cooperate with said latter aperture to prevent gas flow from the purge valve element to the spring chamber during operation of the regulator, spring means for urging said purge valve element away from said latter aperture, and passage means from said spring chamber leading exteriorly of the regulator and including a check valve therein permitting flow only outwardly from the spring chamber.

8. A purgeable regulator as claimed in claim 7 wherein said purge valve element comprises a plunger having a conical tip adapted to engage within and seal the aperture leading from said purge valve chamber to the spring chamber, said spring means biasing said pluger away from said aperture comprising a hair spring, said plunger being disposed within said housing whereby said plunger is closed against said aperture by a substantial flow of gas passing from the pressure chamber into said housing when gas flow through the regulator is initiated, the differential effective area of said plunger in the closed position exposed to the gas pressure in the housing maintaining the plunger in the closed position during operation of the regulator.

References Cited
UNITED STATES PATENTS

| | | | |
|---|---|---|---|
| 1,244,226 | 10/1917 | Metzger | 137—237 |
| 2,563,385 | 8/1951 | Warcup | 137—238 |
| 2,745,429 | 5/1956 | Crookston | 137—627.5 X |
| 2,858,840 | 11/1958 | Wright | 137—627.5 X |
| 3,071,962 | 1/1963 | Perkins | 137—238 X |
| 3,107,693 | 10/1963 | Puster | 137—627.5 X |
| 3,334,648 | 8/1967 | Probst | 137—240 X |

CLARENCE R. GORDON, Primary Examiner

U.S. Cl. X.R.

137—107, 115, 240, 510, 596.18, 627.5